United States Patent
Koyanagi et al.

(10) Patent No.: US 10,778,853 B2
(45) Date of Patent: Sep. 15, 2020

(54) MEDIUM TRANSPORT APPARATUS AND IMAGE READING APPARATUS

(71) Applicant: SEIKO EPSON CORPORATION, Tokyo (JP)

(72) Inventors: Noriyuki Koyanagi, Kitakyushu (JP); Kosuke Nomoto, Fukutsu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/270,827

(22) Filed: Feb. 8, 2019

(65) Prior Publication Data
US 2019/0253564 A1    Aug. 15, 2019

(30) Foreign Application Priority Data
Feb. 15, 2018    (JP) .................................. 2018-025168

(51) Int. Cl.
*H04N 1/047* (2006.01)
*H04N 1/00* (2006.01)
(Continued)

(52) U.S. Cl.
CPC ........ *H04N 1/00018* (2013.01); *B41J 11/006* (2013.01); *B65H 5/062* (2013.01); *B65H 7/06* (2013.01); *G03G 15/70* (2013.01); *H04N 1/00037* (2013.01); *H04N 1/00063* (2013.01); *H04N 1/00082* (2013.01); *H04N 1/00092* (2013.01); *H04N 1/00588* (2013.01); *B65H 2511/20* (2013.01); *B65H 2511/528* (2013.01); *B65H 2515/31* (2013.01); *B65H 2515/50* (2013.01); *B65H 2515/702* (2013.01); *B65H 2515/704* (2013.01); *B65H 2515/706* (2013.01); *B65H 2515/82* (2013.01); *B65H 2801/39* (2013.01); *G03G 2215/00637* (2013.01)

(58) Field of Classification Search
CPC ........... H04N 1/00018; H04N 1/00037; H04N 1/00082; H04N 1/0057; H04N 1/00777; H04N 1/32625; H04N 1/3263
USPC ........ 358/1.15, 1.12, 437, 504; 399/21, 388; 271/256, 259
See application file for complete search history.

(56) References Cited

U.S. PATENT DOCUMENTS

| 7,699,311 | B2 | 4/2010 | Serizawa et al. |
| 8,684,350 | B2 | 4/2014 | Sagawa et al. |

(Continued)

FOREIGN PATENT DOCUMENTS

| JP | 57-169767 A | 10/1982 |
| JP | 2012-131579 A | 7/2012 |

(Continued)

*Primary Examiner* — Jamares Q Washington
(74) *Attorney, Agent, or Firm* — Workman Nydegger

(57) ABSTRACT

A detection section that detects a value used for determining whether or not a jam of a paper sheet has occurred includes a sound detection unit that detects a sound and an auxiliary detection unit that detects a value different from the magnitude of a sound in the case where a jam of the paper sheet has occurred, and, in the case where the sound detection unit has detected a sound of a magnitude equal to or greater than a first threshold value, a control unit controls determines whether or not a jam of the paper sheet has occurred with reference to a detection result of the auxiliary detection unit, and controls a transport unit on the basis of a result of the determination.

10 Claims, 10 Drawing Sheets

(51) Int. Cl.
*B65H 7/06* (2006.01)
*B41J 11/00* (2006.01)
*G03G 15/00* (2006.01)
*B65H 5/06* (2006.01)

(56) References Cited

U.S. PATENT DOCUMENTS

| | | |
|---|---|---|
| 8,827,266 B2 | 9/2014 | Umi et al. |
| 2006/0220305 A1 | 10/2006 | Serizawa et al. |
| 2007/0058023 A1* | 3/2007 | Yoo ..................... B41J 11/0095 347/104 |
| 2009/0060576 A1* | 3/2009 | Tao ................... G03G 15/0131 399/165 |
| 2011/0175282 A1 | 7/2011 | Sagawa et al. |
| 2012/0235929 A1 | 9/2012 | Hongo |
| 2014/0054840 A1 | 2/2014 | Umi et al. |
| 2014/0054841 A1* | 2/2014 | Morikawa ................ B65H 5/00 271/10.01 |
| 2014/0054850 A1 | 2/2014 | Umi et al. |
| 2014/0077448 A1* | 3/2014 | Umi ...................... G03G 15/70 271/264 |
| 2016/0109842 A1* | 4/2016 | Link ..................... G03G 15/70 399/21 |
| 2016/0251183 A1 | 9/2016 | Hongo |
| 2016/0019842 A1 | 12/2016 | Kim |
| 2017/0113891 A1* | 4/2017 | Middleton ............... B65H 7/02 |

FOREIGN PATENT DOCUMENTS

| | | |
|---|---|---|
| JP | 2014-043300 A | 3/2014 |
| JP | 2019-068175 A | 4/2019 |
| WO | WO 2015/087453 | 6/2015 |

\* cited by examiner

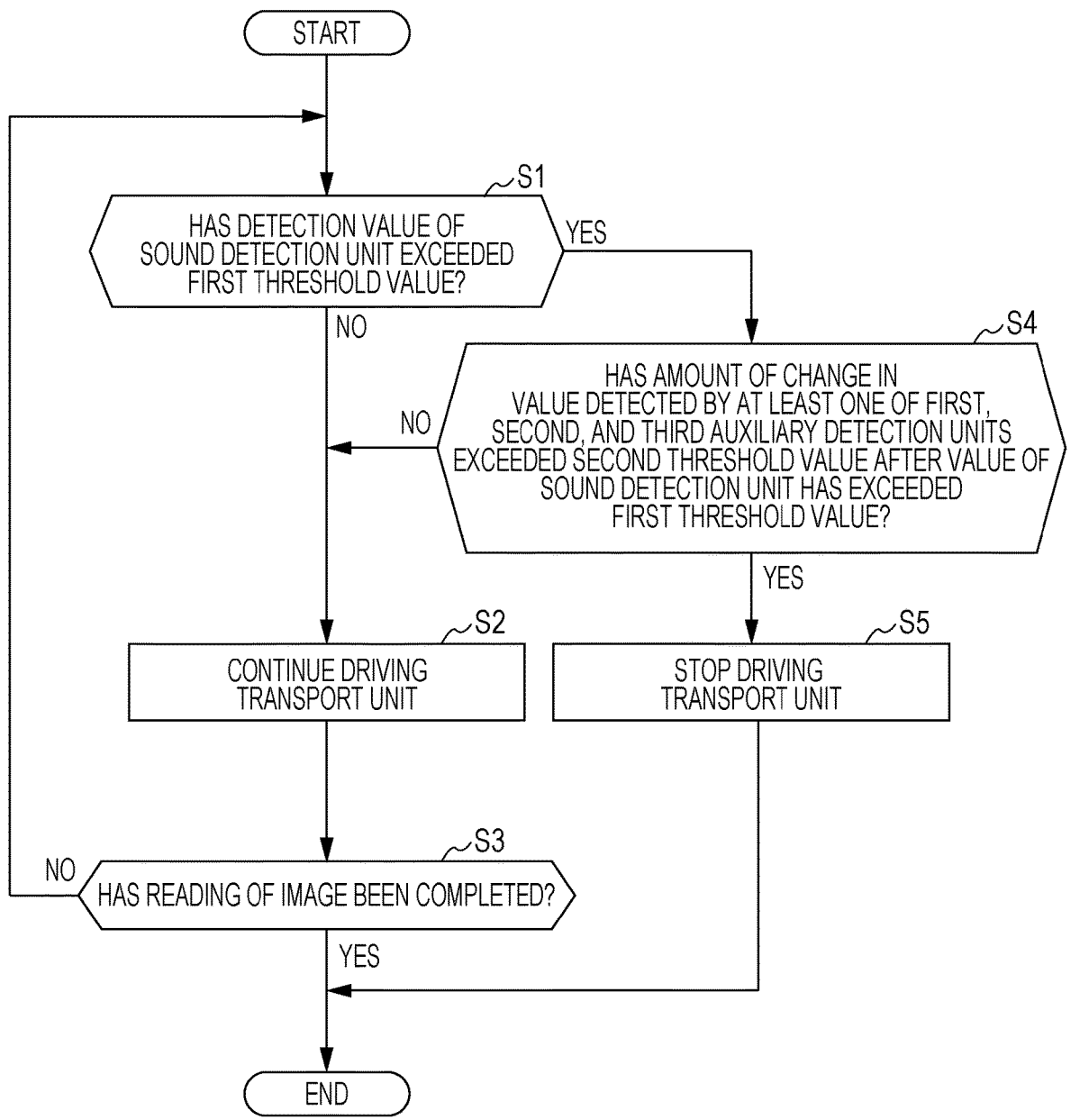

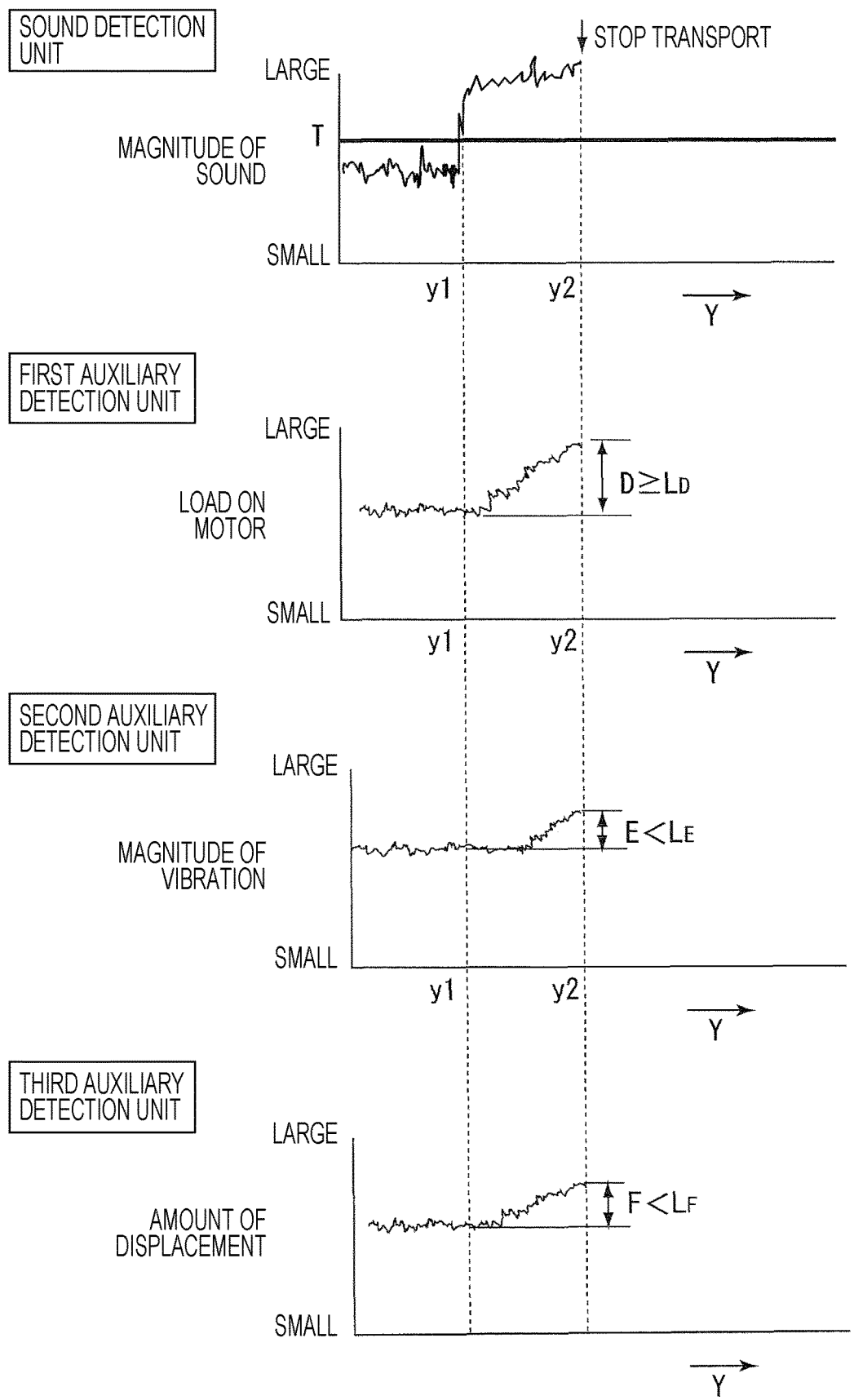

MEDIUM TRANSPORT APPARATUS AND IMAGE READING APPARATUS

BACKGROUND

1. Technical Field

The present invention relates to a medium transport apparatus that transports a medium and to an image reading apparatus that reads a medium transported by the medium transport apparatus.

2. Related Art

Among scanners serving as examples of the image reading apparatus, there are some scanners that include a jam detection sensor provided for detecting a jam of a medium being transported toward a reading unit by the medium transport apparatus.

Examples of such a jam detection sensor include a jam detection sensor that detects occurrence of a jam by a sound (for example, a sound generated when the medium is crumpled and squashed) that is generated in accordance with the occurrence of a jam as disclosed in JP-A-2014-43300.

Here, there is a case where, for example, an already creased medium is read by a scanner. When a creased medium is transported by a roller pair serving as an example of a transport unit while being nipped, the crease is squashed when the medium passes between the roller pair, and a sound similar to a sound generated when a jam occurs is generated.

Therefore, a jam detection sensor that detects occurrence of a jam by a sound sometimes erroneously detects a sound of transport of a creased medium as a sound of occurrence of a jam.

In addition, there is a case where a sound generated around a place where the scanner is installed, for example, a daily life sound (voice, footsteps, and a sound of opening or closing a door) or a sound generated in a driving system inside the scanner, is erroneously detected as occurrence of a jam.

To be noted, there is also a risk of erroneous detection in a jam detection method other than detection by sound, for example, a jam detection method of detecting increase in a load on a drive source of a transport unit that transports a medium. That is, the risk of erroneous detection is not limited to jam detection using a sound.

SUMMARY

An advantage of some aspects thereof is to provide a medium transport apparatus capable of transporting a medium while detecting a jam more accurately and an image reading apparatus including the medium transport apparatus.

A medium transport apparatus according to an aspect of the invention to solve the problem described above is a medium transport apparatus including a transport unit that transports a medium toward a processing unit that processes the medium, a drive source that drives the transport unit, a detection section that detects change in a value to be used for determination of whether or not a jam of the medium has occurred, and a control unit that controls the operation of the transport unit on the basis of a detection result of the detection section. The detection section includes a sound detection unit that detects a sound, and an auxiliary detection unit that detects a value different from a magnitude of the sound. In a case where the sound detection unit has detected a sound having a magnitude equal to or greater than a first threshold value, the control unit determines whether a jam of the medium has occurred with reference to a detection result of the auxiliary detection unit, and controls the transport unit on the basis of a result of the determination.

The detection of occurrence of a jam of the medium can be also performed by, for example, detecting increase in a load on a drive source of a transport unit in the case where the medium is jammed instead of detecting a sound generated when the medium is crumpled.

Here, there is a tendency that a jam of the medium is detected earlier in the case where the occurrence of a jam of the medium is detected by a sound is detected by a sound than in the case where the jam is detected on the basis of a change in a value different from the magnitude of the sound (for example, a change in a load on the drive source). However, there is a risk of erroneous detection by picking up a different sound that is not a sound generated by occurrence of a jam.

According to this aspect, the detection section includes a sound detection unit that detects a sound and an auxiliary detection unit that detects a value different from the magnitude of a sound in the case where a jam of the medium has occurred, and, in the case where the sound detection unit has detected a sound of a magnitude equal to or greater than a first threshold value, the control unit determines whether or not a jam of the medium has occurred with reference to a detection result of the auxiliary detection unit, and controls the transport unit on the basis of a result of the determination. Therefore, the reliability of jam detection by the detection section can be enhanced, and the medium can be transported more appropriately.

According to another aspect of the invention, in the case where the sound detection unit has detected a sound of a magnitude equal to or greater than the first threshold value, the control unit stops driving of the transport unit when the value detected by the auxiliary detection unit is equal to or greater than a second threshold value, and continues the driving of the transport unit when the value detected by the auxiliary detection unit is smaller than the second threshold value.

According to this aspect, in the case where the sound detection unit has detected a sound of a magnitude equal to or greater than the first threshold value, as a result of the control unit stopping driving of the transport unit when the value detected by the auxiliary detection unit is equal to or greater than a second threshold value, and continuing the driving of the transport unit when the value detected by the auxiliary detection unit is smaller than the second threshold value, the effect described above can be achieved.

According to another aspect of the invention, the auxiliary detection unit detects an amount of change in a load on the drive source.

According to this aspect, the effect described above can be achieved in the medium transport apparatus including the auxiliary detection unit that detects an amount of change in a load on the drive source.

According to another aspect of the invention, the auxiliary detection unit detects an amount of change in vibration of the transport unit.

According to this aspect, the effect described above can be achieved in the medium transport apparatus including the auxiliary detection unit that detects an amount of change in vibration of the transport unit.

According to another aspect of the invention a driving force transmission unit that transmits a driving force of the drive source to the transport unit includes a belt mechanism that transmits the driving force of the drive source to the transport unit via a belt, the belt mechanism includes a tension imparting portion that is displaceable in a direction in which tension of the belt changes and that imparts tension to the belt, and the auxiliary detection unit detects an amount of displacement of the tension imparting portion.

According to this aspect, the effect described above can be achieved in the medium transport apparatus including the auxiliary detection unit that detects an amount of displacement of the tension imparting portion.

According to another aspect of the invention, the second threshold value is set to a value smaller than a threshold value set in the case where the auxiliary detection unit detects the occurrence of a jam alone instead of in combination with the sound detection unit.

According to this aspect, highly reliable jam detection can be performed earlier.

According to another aspect of the invention, a driving force transmission unit that transmits a driving force of the drive source to the transport unit includes a belt mechanism that transmits the driving force of the drive source to the transport unit via a belt, the belt mechanism includes a tension imparting portion that is displaceable in a direction in which tension of the belt changes and that imparts tension to the belt, the auxiliary detection unit includes a first auxiliary detection unit that detects a load on the drive source, a second auxiliary detection unit that detects an amount of change in vibration of the transport unit, and a third auxiliary detection unit that detects an amount of displacement of the tension imparting portion, and, in a case where the sound detection unit has detected a sound of a magnitude equal to or greater than a first threshold value, the control unit stops driving of the transport unit when any one of the first auxiliary detection unit, the second auxiliary detection unit, and the third auxiliary detection unit has detected a change equal to or greater than a predetermined value in a value detected thereby, and continues the driving of the transport unit when none of the first auxiliary detection unit, the second auxiliary detection unit, and the third auxiliary detection unit has detected the change equal to or greater than the predetermined value in the value detected thereby.

According to this aspect, in the case where the sound detection unit has detected a sound of a magnitude equal to or larger than the first threshold value, the control unit stops driving of the transport unit when any one of the first auxiliary detection unit, the second auxiliary detection unit, and the third auxiliary detection unit has detected a change equal to or greater than a predetermined value in a value detected thereby, and continues driving of the transport unit when none of the first auxiliary detection unit, the second auxiliary detection unit, and the third auxiliary detection unit has detected a change equal to or greater than the predetermined value in the value detected thereby. Therefore, the reliability of jam detection can be enhanced more.

According to another aspect of the invention, a driving force transmission unit that transmits a driving force of the drive source to the transport unit includes a belt mechanism that transmits the driving force of the drive source to the transport unit via a belt, the transport unit includes a discharge roller pair provided downstream of the processing unit, the belt mechanism includes a tension imparting portion that is displaceable in a direction in which tension of the belt changes and that imparts tension to the belt, the auxiliary detection unit includes a first auxiliary detection unit that detects a load on the drive source, a second auxiliary detection unit that detects an amount of change in vibration of the transport unit, and a third auxiliary detection unit that detects an amount of displacement of the tension imparting portion, and the control unit gives higher priority to a detection result of the auxiliary detection unit than to a detection result of the sound detection unit in a case where a transport position of a leading end of the medium has reached a nip position of the discharge roller pair.

In the case where the sound detection unit is provided between a nip position of the feeding roller and the separation roller and a nip position of the transport roller pair in the medium transport direction, when the transport position of the leading end of the medium reaches the vicinity of the nip position of the discharge roller pair, a sound of jam generated when the leading end of the medium is jammed becomes less likely to be detected by the sound detection unit.

According to this aspect, as a result of the control unit giving higher priority to the detection result of the auxiliary detection unit than to the detection result of the sound detection unit in the case where the transport position of the leading end of the medium has passed the nip position of the discharge roller pair, jam detection can be performed with higher reliability.

According to another aspect of the invention, the transport unit includes a feeding roller that delivers out the medium from a medium mounting portion on which the medium is mounted to a medium transport path, a separation roller that separates the medium by nipping the medium between the separation roller and the feeding roller, and a transport roller pair that transports the medium delivered from the feeding roller toward the processing unit, and the sound detection unit is provided between a nip position of the feeding roller and the separation roller and a nip position of the transport roller pair in a medium transport direction.

According to this aspect, since the sound detection unit is provided between a nip position of the feeding roller and the separation roller and a nip position of the transport roller pair in a medium transport direction, a jam of the medium having occurred upstream of the transport roller pair and upstream of the processing unit can be more likely to be detected.

According to another aspect of the invention, two transport roller pairs are provided as the transport roller pair with an interval therebetween in a width direction crossing the medium transport direction, and the sound detection unit is disposed so as to at least partially overlap a region from an outer end portion of one of the two transport roller pairs to an outer end portion of another of the two transport roller pairs in the width direction.

According to this aspect, since two transport roller pairs are provided as the transport roller pair with an interval therebetween in a width direction crossing the medium transport direction, and the sound detection unit is disposed so as to at least partially overlap a region from an outer end portion of one of the two transport roller pairs to an outer end portion of another of the two transport roller pairs in the width direction, a jam occurring in the vicinity of the transport roller pair can be more reliably detected.

A medium transport apparatus according to another aspect of the invention is a medium transport apparatus including a transport unit that transports a medium toward a processing unit that processes the medium, a drive source that drives the transport unit, a driving force transmission unit that includes a belt mechanism that transmits a driving force via a belt and transmits the driving force of the drive source to the transport unit by the belt mechanism, a tension imparting portion that is provided in the belt mechanism, is displaceable in a direction in which tension of the belt changes, and imparts tension to the belt, a detection section that detects a change in a value to be used for determination of whether or not a jam of the medium has occurred, a control unit that controls an operation of the transport unit on the basis of a detection result of the detection section, the detection section includes a plurality of detection units, the plurality of detection units include at least two of a sound detection unit that detects a sound, a first detection unit that detects a load on the drive source, a second detection unit that detects an amount of change in vibration of the transport unit, and a third detection unit that detects an amount of displacement of the tension imparting portion, and, during transport of the medium, the control unit stops driving of the transport unit when the at least two of the plurality of detection units constituting the detection section have detected changes equal to or greater than predetermined values in values detected thereby, and continues the driving of the transport unit when only one of the plurality of detection units constituting the detection section has detected a change equal to or greater than a predetermined value in a value detected thereby.

According to this aspect, during transport of the medium, the control unit stops driving of the transport unit when the at least two of the plurality of detection units constituting the detection section have detected changes equal to or greater than predetermined values in values detected thereby, and continues the driving of the transport unit when only one of the plurality of detection units constituting the detection section has detected a change equal to or greater than a predetermined value in a value detected thereby. Therefore, the reliability of jam detection by the detection section can be enhanced, and the medium can be transported more appropriately.

An image reading apparatus according to another aspect of the invention includes a reading unit that reads a medium, and the medium transport apparatus according to any one of the aspects described above including the reading unit as the processing unit.

According to this aspect, the effect described above can be achieved in an image reading apparatus including a reading unit that reads a medium.

BRIEF DESCRIPTION OF THE DRAWINGS

The invention will be described with reference to the accompanying drawings, wherein like numbers reference like elements.

FIG. 9 is a flowchart illustrating an example of control by a control unit.

FIG. 10 is a diagram illustrating an example of change in values of a sound detection unit, a first auxiliary detection unit, a second auxiliary detection unit, and a third auxiliary detection unit according to transport of a paper sheet.

DESCRIPTION OF EXEMPLARY EMBODIMENTS

First Embodiment

First, an overview of an image reading apparatus according to an embodiment of the invention will be described with reference to drawings. In the present embodiment, a document scanner 1 (hereinafter simply referred to as a scanner 1) capable of reading at least one of a front surface and a back surface of a paper sheet serving as a "medium" will be described as an example of an image reading apparatus.

In an X-Y-Z coordinate system shown in each diagram, an X direction corresponds to an apparatus width direction and a sheet width direction, and a Y direction corresponds to a sheet transport direction. A Z direction is a direction crossing the Y direction, and approximately indicates a direction perpendicular to the surface of a paper sheet that is being transported. In addition, a +Y direction corresponds to an apparatus front side, and a −Y direction corresponds to an apparatus rear side. In addition, as viewed from the apparatus front side, a +X direction corresponds to the left side, and a −X direction corresponds to the right side. In addition, a +Z direction is upward from the apparatus (including an upper portion, an upper surface, and the like), and a −Z direction is downward from the apparatus (including a lower portion, a lower surface, and the like). Further, a side (+Y side) to which a paper sheet P is fed will be referred to as a "downstream side", and a side (−Y side) opposite to this will be referred to as an "upstream side".

Overview of Scanner

Hereinafter, the scanner 1 according to the invention will be described mainly with reference to FIGS. 1 and 2.

Figure 1:
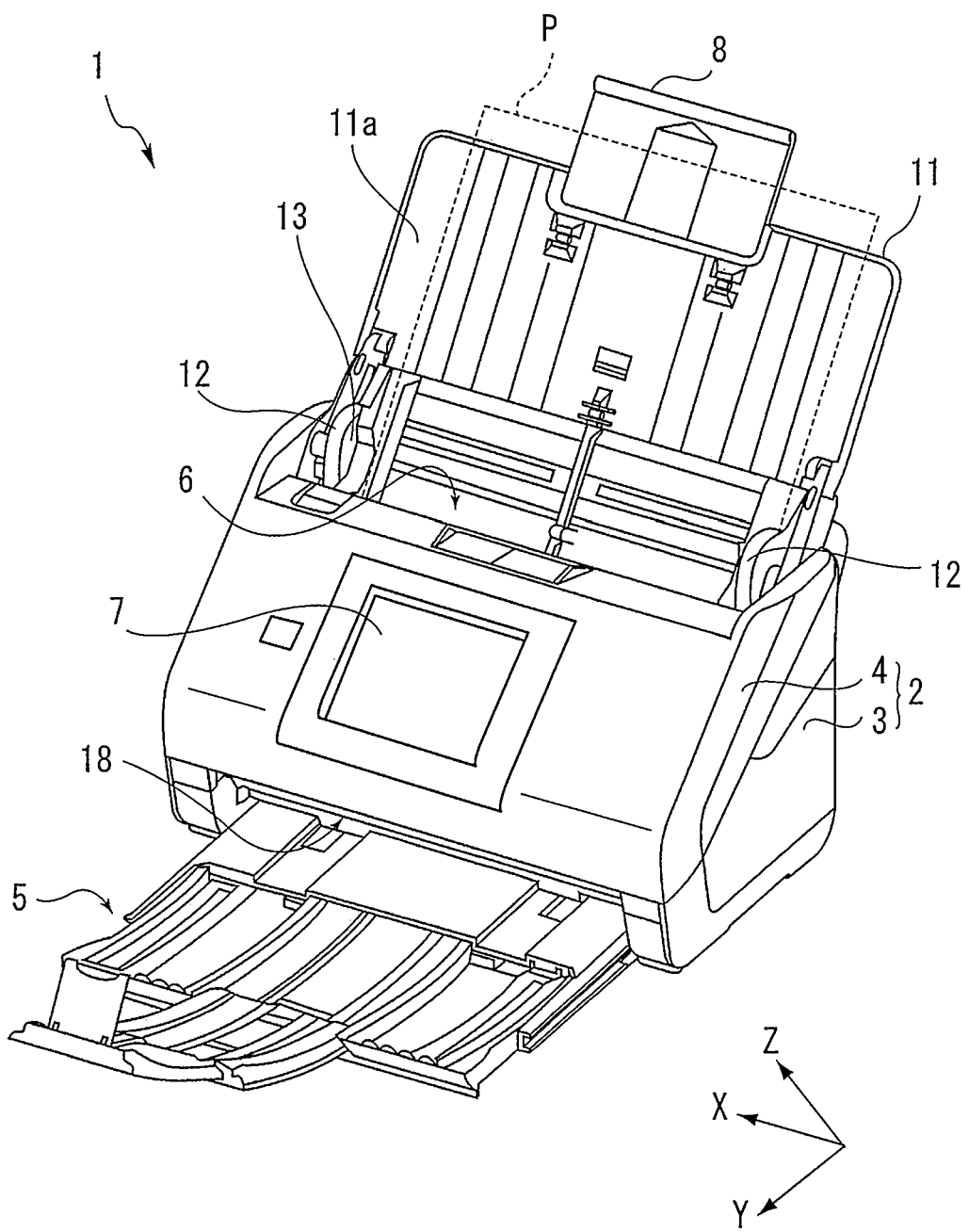
FIG. 1 is an external perspective view of a scanner according to the invention.
Figure 2:
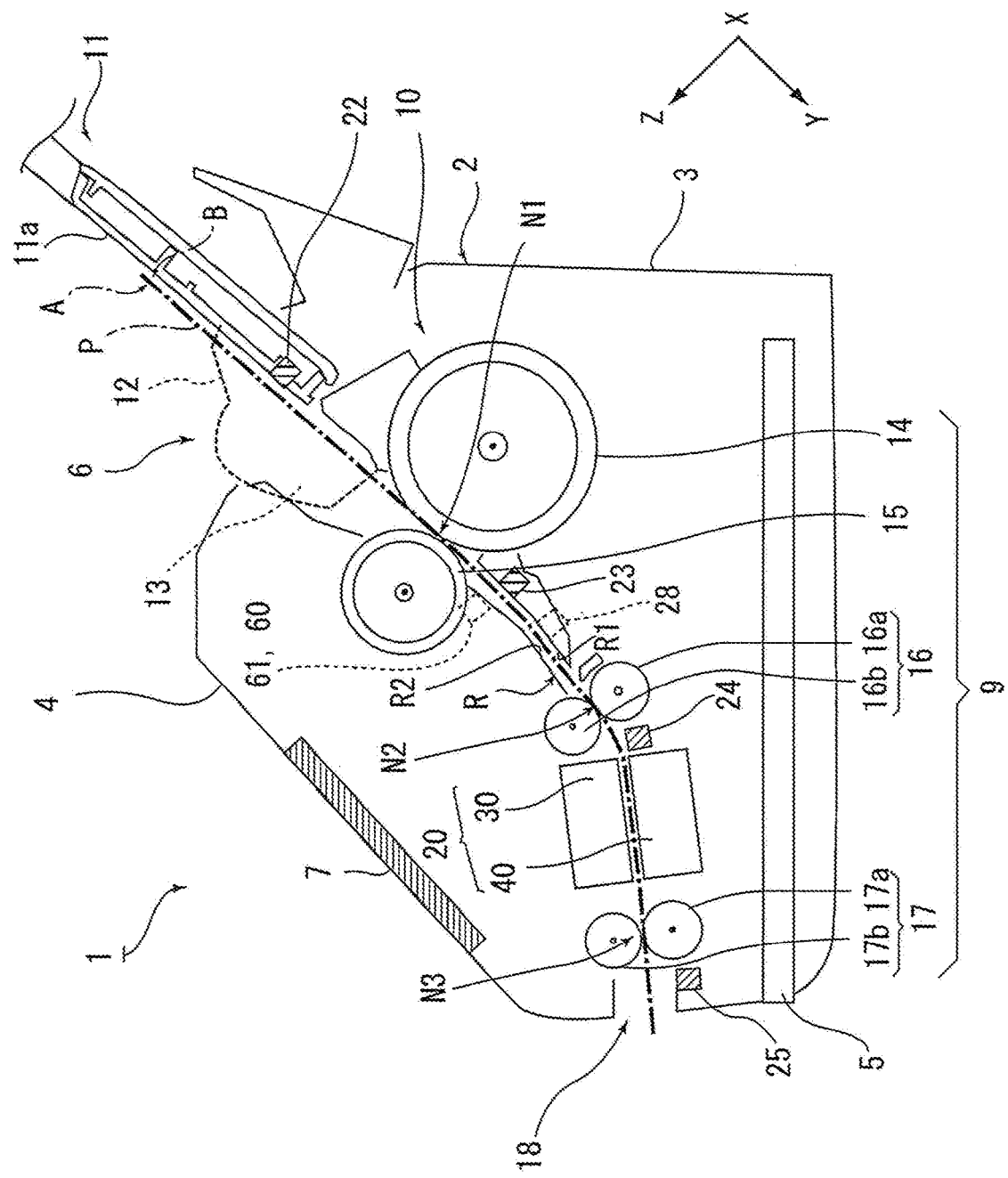
FIG. 2 is a schematic side section view of the scanner according to the invention.

The scanner 1 illustrated in FIG. 1 includes, as a "processing unit" that processes a paper sheet P serving as a "medium", a reading unit 20 that reads an image on the paper sheet P transported through a medium transport path R illustrated in FIG. 2.

As illustrated in FIG. 2, the scanner 1 includes therein a medium transport apparatus 10 provided with a transport unit 9 that transports a paper sheet toward the reading unit 20. The medium transport apparatus 10 will be described in detail when describing the medium transport path R after describing the overview of the scanner 1.

As illustrated in FIG. 1, the outside of the scanner 1 is constituted by a body 2 including the medium transport apparatus 10 and the reading unit 20 therein.

The body 2 includes a lower portion unit 3 and an upper portion unit 4. The upper portion unit 4 is attached to the lower portion unit 3 such that the upper portion unit 4 can be opened and closed by pivoting about a pivot point on the downstream side in the sheet transport direction, and the upper portion unit 4 is configured such that a sheet jam can be easily removed by pivoting the upper portion unit 4 toward the apparatus front side to open and expose the medium transport path R illustrated in FIG. 2 is exposed.

A medium mounting portion 11 on which a paper sheet P to be transported to the medium transport path R is to be mounted is provided on the apparatus rear side, which is the −Y side of the body 2. The medium mounting portion 11 is provided so as to be partially exposed to the outside of the body 2. In the present embodiment, the medium mounting portion 11 is provided so as to be projected on the apparatus rear side of the body 2. To be noted, the medium mounting portion 11 of the present embodiment can be used as a cover of the body 2 by being pivoted toward the apparatus front side when the scanner 1 is not used.

A bundle of paper sheets in which a plurality of paper sheets P are stacked can be mounted on the medium mounting portion 11. A reference sign 11a corresponds to a mounting surface 11a for the paper sheet P.

In addition, a pair of edge guides 12 including guide surfaces 13 that guide side edges in the width direction (X direction) crossing the medium transport direction (+Y direction) are respectively provided on the left and right sides of the medium mounting portion 11.

The edge guides 12 are provided so as to be slidable in the X direction in accordance with the size of the paper sheet P. In the present embodiment, the edge guides 12 are configured such that one edge guide 12 (for example, −X side) follows movement of the other edge guide 12 (+X side) in the X direction and moves in the opposite direction by a known rack-pinion mechanism.

On the medium mounting portion 11, the paper sheets P are aligned at the center in the width direction, and are fed by a so-called center feeding method by a feeding roller 14 that is provided in a center region in the width direction and that will be described later.

The medium mounting portion 11 includes an auxiliary paper support 8. The auxiliary paper support 8 can be accommodated in the medium mounting portion 11 and can be pulled out from the medium mounting portion 11 as illustrated in FIG. 1, and thus the length of the mounting surface 11a can be adjusted.

As illustrated in FIG. 1, an operation panel 7 for inputting an operation for various reading settings and execution of reading, and displaying the reading settings and the like is provided on the apparatus front side of the upper portion unit 4.

A feeding port 6 communicating with the inside of the body 2 is provided in an upper portion of the upper portion unit 4, and the paper sheet P mounted on the medium mounting portion 11 is transported toward the reading unit 20 illustrated in FIG. 2 through the feeding port 6.

In addition, a sheet discharge tray 5 onto which the paper sheet P read by the reading unit 20 is to be discharged is provided on the apparatus front side of the lower portion unit 3.

The sheet discharge tray 5 is provided in the lower portion unit 3 such that the sheet discharge tray 5 can be pulled out from a discharge port 18 toward the apparatus front side. The sheet discharge tray 5 can take a state of being accommodated in a bottom portion of the lower portion unit 3 as illustrated in FIG. 2, and a state of having been pulled out toward the apparatus front side as illustrated in FIG. 1. In the state of having pulled out the sheet discharge tray 5, paper sheets P discharged through the discharge port 18 can be stacked on the sheet discharge tray 5.

Medium Transport Path in Scanner

The medium transport path R in the scanner 1 will be described below. To be noted, a one-dot chain line denoted by a reference sign P in FIG. 2 indicates the paper sheet P being transported along the medium transport path R. The medium transport path R is a space defined between a lower side path surface R1 of the lower portion unit 3 and an upper side path surface R2 of the upper portion unit 4.

The medium transport apparatus 10 is provided inside the body 2 illustrated in FIG. 2.

Figure 4:
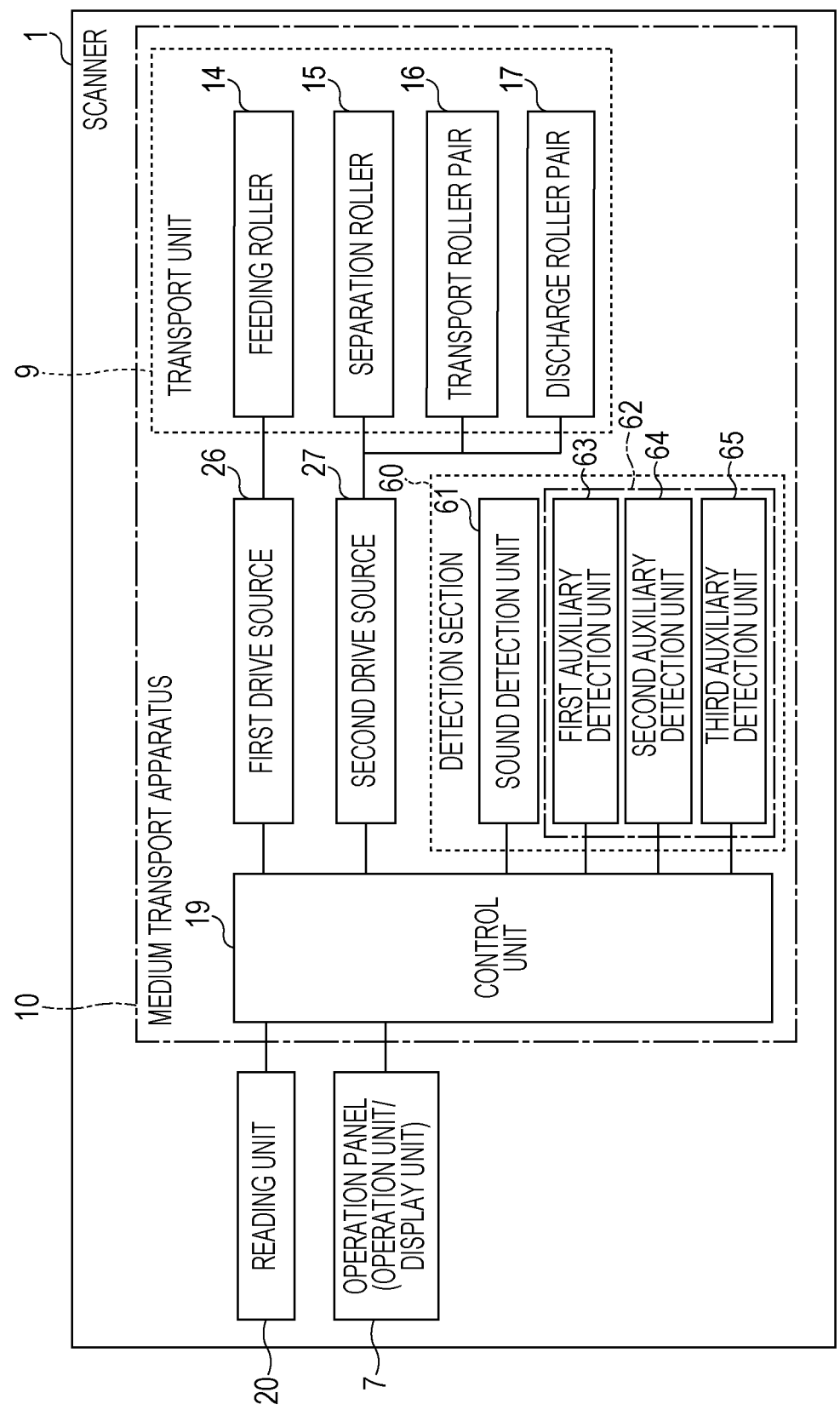
FIG. 4 is a block diagram illustrating a configuration of the scanner according to the invention.

As illustrated in FIG. 4, the medium transport apparatus 10 includes the transport unit 9 that transports the paper sheet P toward the reading unit 20, a first drive source 26 and a second drive source 27 serving as drive sources for driving the transport unit 9, a detection section 60 that detects a change in a value used for determination of occurrence of a jam of the paper sheet P, and a control unit 19 that controls the operation of the transport unit 9 on the basis of a detection result of the detection section 60.

Details of the detection section 60 will be described after describing the medium transport path R.

The transport unit 9 is provided in the medium transport path R. In the present embodiment, the transport unit 9 includes a feeding roller 14 that delivers out the paper sheet P from the medium mounting portion 11 on which the paper sheet P is mounted to the medium transport path R, a separation roller 15 that nips paper sheets P between the feeding roller 14 and the separation roller 15 to separate a paper sheet P, a transport roller pair 16 that transports the paper sheet P fed by the feeding roller 14 to the reading unit 20, and a discharge roller pair 17 provided downstream of the reading unit 20. The operation of the transport unit 9 is controlled by the control unit 19. The control unit 19 controls an operation related to image reading by the scanner 1 in addition to the operation of the transport unit 9.

The transport roller pair 16 includes a first driving roller 16a and a first driven roller 16b. The discharge roller pair 17 includes a second driving roller 17a and a second driven roller 17b.

The feeding roller 14, the first driving roller 16a, and the second driving roller 17a are provided so as to be rotatable with respect to the lower portion unit 3. In addition, the separation roller 15 provided at a position opposing the feeding roller 14, the first driven roller 16b, and the second driven roller 17b are provided so as to be rotatable with respect to the upper portion unit 4.

The paper sheet P mounted on the medium mounting portion 11 is transported toward the reading unit 20 by the feeding roller 14.

The separation roller 15 that nips paper sheets P between the feeding roller 14 and the separation roller 15 to separate a paper sheet P is provided at a position opposing the feeding roller 14. The separation roller 15 is capable of being rotationally driven in a direction (counterclockwise direction in FIG. 2) opposite to the feeding direction of the paper sheet P by the second drive source 27 that will be described later.

As described above, the feeding roller 14 is configured to feed a sheet by a center feeding method, and the feeding roller 14 and the separation roller 15 are provided in a center region in the medium width direction (X direction) crossing the medium transport direction (+Y direction).

The transport roller pair 16 and the discharge roller pair 17 that transport the paper sheet P fed by the feeding roller 14 are provided downstream of the feeding roller 14.

The reading unit 20 is provided between the transport roller pair 16 and the discharge roller pair 17.

The paper sheet P mounted on the medium mounting portion 11 is picked up and fed to the downstream side (+Y side) by the feeding roller 14. Specifically, the feeding roller 14 rotates in contact with a surface of the paper sheet P facing the medium mounting portion 11, and thus the paper sheet P is fed to the downstream side. Therefore, in the case where a plurality of paper sheets P are set on the medium mounting portion 11 in the scanner 1, the paper sheets P are sequentially fed to the downstream side starting from a paper sheet P on the mounting surface 11a side.

The transport roller pair 16 is provided upstream of the reading unit 20, and transports the paper sheet P fed by the feeding roller 14 toward the reading unit 20. The transport roller pair 16 is also provided in the center region in the medium width direction similarly to the feeding roller 14.

The reading unit 20 includes an upper reading unit 30 provided on the upper portion unit 4 side and a lower reading unit 40 provided on the lower portion unit 3 side.

The upper reading unit 30 and the lower reading unit 40 are each constituted as, for example, a contact image sensor module (CISM).

The upper reading unit 30 reads a first surface A (surface facing upward) of the paper sheet P, and the lower reading unit 40 reads a second surface B (surface facing downward) that is opposite to the first surface A.

After an image of at least one of the first surface A and the second surface B of the paper sheet P is read by the reading unit 20, the paper sheet P is nipped by the discharge roller pair 17 positioned downstream of the reading unit 20 and discharged through the discharge port 18 provided on the apparatus front side of the lower portion unit 3.

Figure 3:
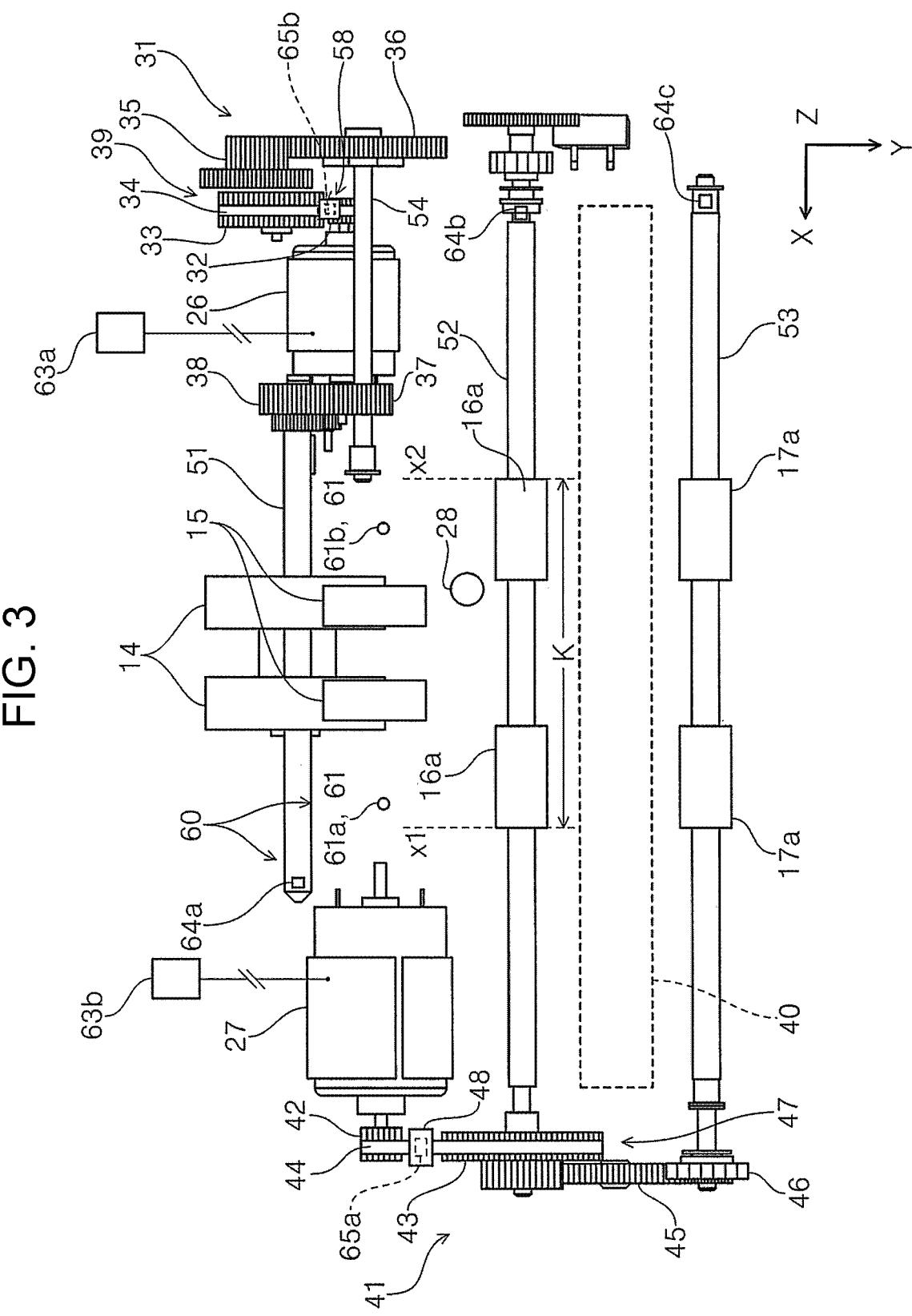
FIG. 3 is a plan view of a medium transport apparatus according to the invention.

In the present embodiment, the feeding roller 14 serving as the transport unit 9 is configured to be rotationally driven by the first drive source 26 as illustrated in FIG. 3. A first driving force transmission unit 31 transmits a driving force of the first drive source 26 to the feeding roller 14.

In addition, the separation roller 15, the first driving roller 16*a*, and the second driving roller 17*a* constituting the transport unit 9 are configured to be rotationally driven by the second drive source 27. A second driving force transmission unit 41 transmits a driving force of the second drive source 27 to the first driving roller 16*a*, the second driving roller 17*a*, and the separation roller 15.

The first drive source 26 and the second drive source 27 are provided in the lower portion unit 3 illustrated in FIG. 2.

The first drive source 26 and the second drive source 27 are controlled by the control unit 19, and thus driving of the feeding roller 14, the separation roller 15, the first driving roller 16*a*, and the second driving roller 17*a* constituting the transport unit 9 is controlled.

A plurality of medium detection units that detect the paper sheet P are provided in the medium transport path R illustrated in FIG. 2.

For example, a first medium detection unit 22 that detects the presence or absence of the paper sheet P mounted on the medium mounting portion 11 is provided in a mounting region for mounting the paper sheet P on the medium mounting portion 11 upstream of the feeding roller 14. In addition, a second medium detection unit 23, a third medium detection unit 24, and a fourth medium detection unit 25 are respectively provided downstream of the feeding roller 14, downstream of the transport roller pair 16, and downstream of the discharge roller pair 17. The position of the paper sheet P in the medium feeding direction can be detected by the second medium detection unit 23 and the third medium detection unit 24.

In addition, a multiple transport detection unit 28 that detects multiple transport in which a plurality of the paper sheets P are transported in an overlapping state is provided upstream of the transport roller pair 16.

As the first medium detection unit 22, the second medium detection unit 23, the third medium detection unit 24, and the fourth medium detection unit 25, an optical sensor including a light emitting portion (not illustrated) that emits light and a light receiving portion (not illustrated) that receives reflection light of the light emitted from the light emitting portion can be used. In addition, instead of the optical sensors, an ultrasonic wave sensor including a transmission portion that generates an ultrasonic wave and a receiving portion provided to oppose the transmission portion with a paper sheet being transported interposed therebetween can be also used. In addition, a lever sensor that detects displacement of a mechanical lever moved by contact of the transported paper sheet by an optical method or an electrical contact method can be used. As the multiple transport detection unit 28, the ultrasonic wave sensor described above can be used.

Detection Section

The detection section 60 will be described with reference to FIGS. 2 to 4.

In FIG. 4, the medium transport apparatus 10 of the scanner 1 includes the detection section 60 that detects change in a value to be used for determination of occurrence of a jam of the paper sheet P in the medium transport path R. The control unit 19 determines whether or not a jam has occurred on the basis of a detection result of the detection section 60. The determination by the control unit 19 will be described after describing the configuration of the detection section 60.

The detection section 60 includes a sound detection unit 61 that detects a sound, and an auxiliary detection section 62 that detects changes in values different from the magnitude of the sound in the case where a jam of the paper sheet has occurred.

In the present embodiment, as illustrated in FIG. 4, the auxiliary detection section 62 includes three kinds of auxiliary detection units including a first auxiliary detection unit 63, a second auxiliary detection unit 64, and a third auxiliary detection unit 65 that detect different subjects.

Hereinafter, the sound detection unit 61, the first auxiliary detection unit 63, the second auxiliary detection unit 64, and the third auxiliary detection unit 65 will be sequentially described.

Sound Detection Unit

The sound detection unit 61 is a microphone that includes a sound collecting mechanism and transmits a signal corresponding to the magnitude of the collected sound to the control unit 19. The intensity of the signal that the sound detection unit 61 transmits to the control unit 19 increases and decreases in accordance with increase and decrease in a value of the magnitude of the sound.

When a jam occurs, a sound of squashing or crumpling the paper sheet P is generated. The determination of whether or not a jam has occurred performed by the control unit 19 that will be described later is mainly performed on the basis of this sound.

In the present embodiment, the sound detection unit 61 is provided between a nip position N1 of the feeding roller 14 and the separation roller 15 and a nip position N2 of the transport roller pair 16 in the medium transport direction as illustrated in FIG. 2.

As a result of the sound detection unit 61 being provided at this position, a jam of the paper sheet P that has occurred in the early stage, that is, upstream of the transport roller pair 16, or also upstream of the reading unit 20 can be easily detected.

In addition, as illustrated in FIG. 3, two transport roller pairs are provided as the transport roller pair 16 with an interval therebetween in the width direction (X direction) crossing the medium transport direction, and the sound detection unit 61 is disposed in a region K extending from an outer end portion x1 of one of the two transport roller pairs 16 on the +X side to an outer end portion x2 of the other of the transport roller pairs 16 on the −X side in the width direction.

In the present embodiment, two sound detection units 61*a* and 61*b* are provided so as to interpose the feeding roller 14 therebetween. The two sound detection units 61*a* and 61*b* are desirably disposed so as to at least partially overlap the region K. As a result of this, a jam occurring in the vicinity of the transport roller pair 16 can be detected more reliably.

A plurality of the sound detection units 61 may be provided, and, for example, the sound detection unit 61 may be only one provided in the center region in the width direction. As a matter of course, the sound detection unit 61 may be provided outside of the region K in the width direction.

First Auxiliary Detection Unit

The first auxiliary detection unit 63 detects an amount of change in a load on a drive source (the first drive source 26 and the second drive source 27) that drives the transport unit 9. When a jam occurs, since the operation of the drive source is suppressed, the load on the drive source increases. The change in the load on the drive source can be observed through, for example, change in a driving current.

In the present embodiment, as illustrated in FIG. 3, a first auxiliary detection unit 63a that detects an amount of change in a load on the first drive source 26 and a first auxiliary detection unit 63b that detects an amount of change in a load on the second drive source 27 are provided.

In the case where a jam that hinders rotation of the feeding roller 14 occurs, the load on the first drive source 26 changes. In the case where a jam that hinders rotation of the transport roller pair 16 and the discharge roller pair 17 occurs, the load on the second drive source 27 changes.

Second Auxiliary Detection Unit

The second auxiliary detection unit 64 detects an amount of change in vibration of the transport unit 9. As the second auxiliary detection unit 64, for example, a vibration meter such as an acceleration pickup can be used. The second auxiliary detection unit 64 transmits a signal corresponding to the magnitude of the vibration to the control unit 19.

When a driving force is continuously transmitted to the drive source (the first drive source 26 and the second drive force 27) of the transport unit 9 in an unoperable state caused by occurrence of a jam, the vibration of the transport unit 9 becomes stronger.

In the present embodiment, the second auxiliary detection unit 64 is provided for each of the feeding roller 14, the first driving roller 16a of the transport roller pair 16, and the second driving roller 17a of the discharge roller pair 17.

As illustrated in FIG. 3, a second auxiliary detection unit 64a is provided on the +X side of a shaft portion 51 of the feeding roller 14, a second auxiliary detection unit 64b is provided on the −X side of a shaft portion 52 of the first driving roller 16a, and a second auxiliary detection unit 64c is provided on the −X side of a shaft portion 53 of the second driving roller 17a. To reduce the influence of the vibration of the drive source itself, the second auxiliary detection units 64a, 64b, and 64c are provided on the end portions of the shaft portions 51, 52, and 53 on the side far from the drive source.

Figure 5:
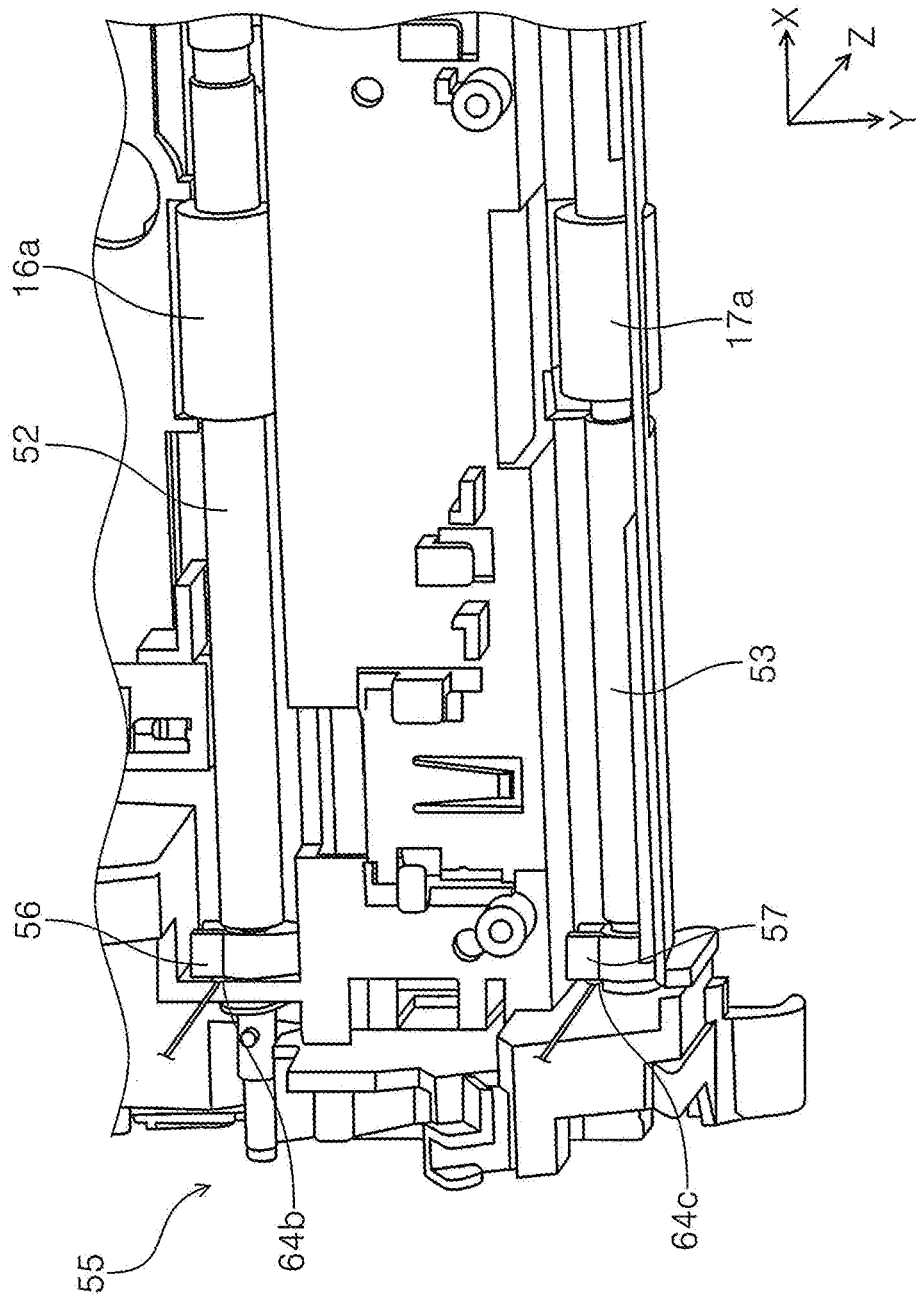
FIG. 5 is a perspective view of the medium transport apparatus illustrating second auxiliary detection units attached to shaft portions.

In addition, as illustrated in FIG. 5, the second auxiliary detection unit 64b and the second auxiliary detection unit 64c are respectively attached to a bearing 56 and a bearing 57 of a lower frame 55 to which the first driving roller 16a and the second driving roller 17a are attached. The lower frame 55 is a member that is attached to the lower portion unit 3 and forms the lower side path surface R1.

Figure 6:
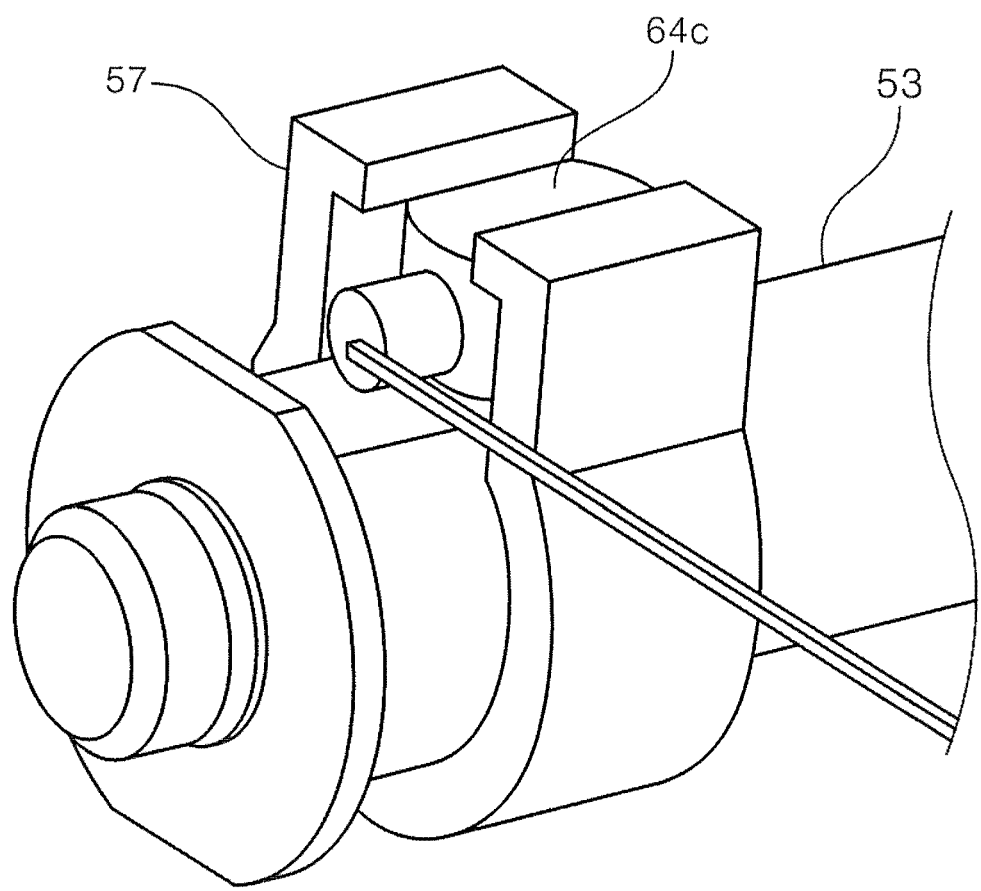
FIG. 6 is an enlarged perspective view of the medium transport apparatus illustrating the second auxiliary detection units attached to shaft portions.

FIG. 6 is an enlarged view of the bearing 57 and the surroundings thereof. The bearing 57 fixes the second auxiliary detection unit 64c and the shaft portion 53 in contact with each other.

Third Auxiliary Detection Unit

The third auxiliary detection unit 65 is provided in the first driving force transmission unit 31 that transmits the driving force of the first drive source 26 to the feeding roller 14 and in the second driving force transmission unit 41 that transmits the driving force of the second drive source 27 to the first driving roller 16a, the second driving roller 17a, and the separation roller 15.

The first driving force transmission unit 31 and the second driving force transmission unit 41 illustrated in FIG. 3 each include a belt mechanism (the first belt mechanism 39 and the second belt mechanism 47) that transmits a driving force via a belt, and transmits a driving force from a drive source (the first drive source 26 and the second drive source 27) by the belt mechanism and a plurality of gears.

The third auxiliary detection unit 65 detects an amount of displacement of a tension imparting portion (a first tension imparting portion 58 and a second tension imparting portion 48) provided in the belt mechanism that will be described later.

A first belt mechanism 39 that constitutes the first driving force transmission unit 31 illustrated in FIG. 3 includes a first gear 32, a second gear 33, and a belt 34 looped over the first gear 32 and the second gear 33. The first gear 32 is provided on a rotation shaft of the first drive source 26. The second gear 33 engages with a third gear 35, and a driving force is transmitted to the shaft portion 51 through the third gear 35, a fourth gear 36, a fifth gear 37, and a sixth gear 38.

Figure 7:
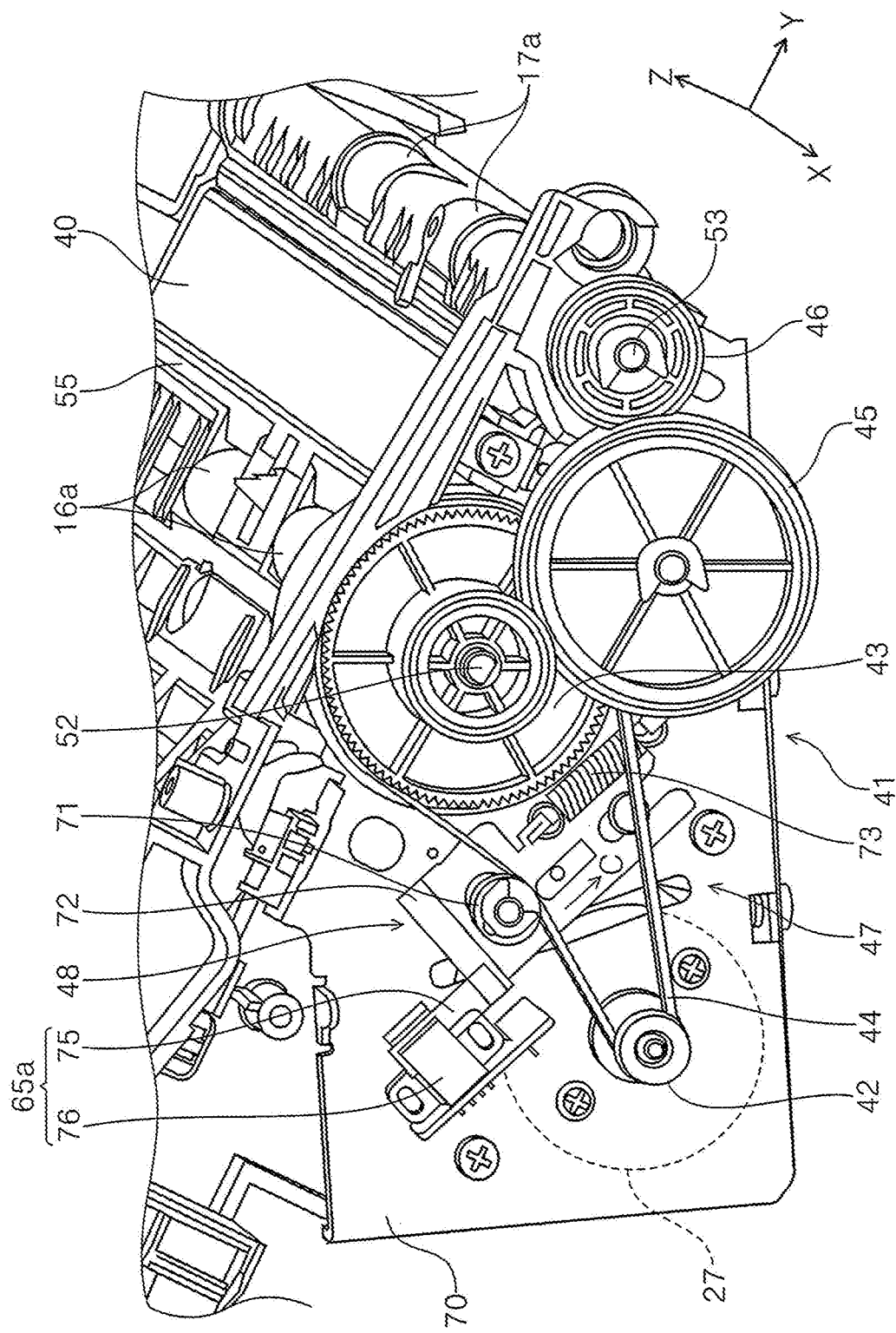
FIG. 7 is a perspective view of a second driving force transmission unit.

In addition, a second belt mechanism 47 that constitutes the second driving force transmission unit 41 illustrated in FIGS. 3 and 7 includes a seventh gear 42, an eighth gear 43, and a belt 44 looped over the seventh gear 42 and the eighth gear 43. The seventh gear 42 is provided on a rotation shaft of the second drive source 27.

The eighth gear 43 is provided on the shaft portion 52 of the first driving roller 16a, and the first driving roller 16a rotates when the eighth gear 43 rotates.

Further, the eighth gear 43 engages with a ninth gear 45, and a driving force is transmitted from the ninth gear 45 to a tenth gear 46. The tenth gear 46 is provided on the shaft portion 53 of the second driving roller 17a, and the second driving roller 17a rotates when the tenth gear 46 rotates. The shaft portion 53 further includes an unillustrated gear on an end portion thereof on the −X side, and the driving force of the second drive source 27 is transmitted to the separation roller 15 via a plurality of gears.

The first belt mechanism 39 and the second belt mechanism 47 are respectively provided with a first tension imparting portion 58 and a second tension imparting portion 48 that are respectively displaceable in directions in which tension of the belts 34 and 44 change and that respectively impart tension to the belts 34 and 44.

The second tension imparting portion 48 of the second belt mechanism 47 and the third auxiliary detection unit 65a that detects the amount of displacement of the second tension imparting portion 48 will be described with reference to FIG. 8.

Figure 8:
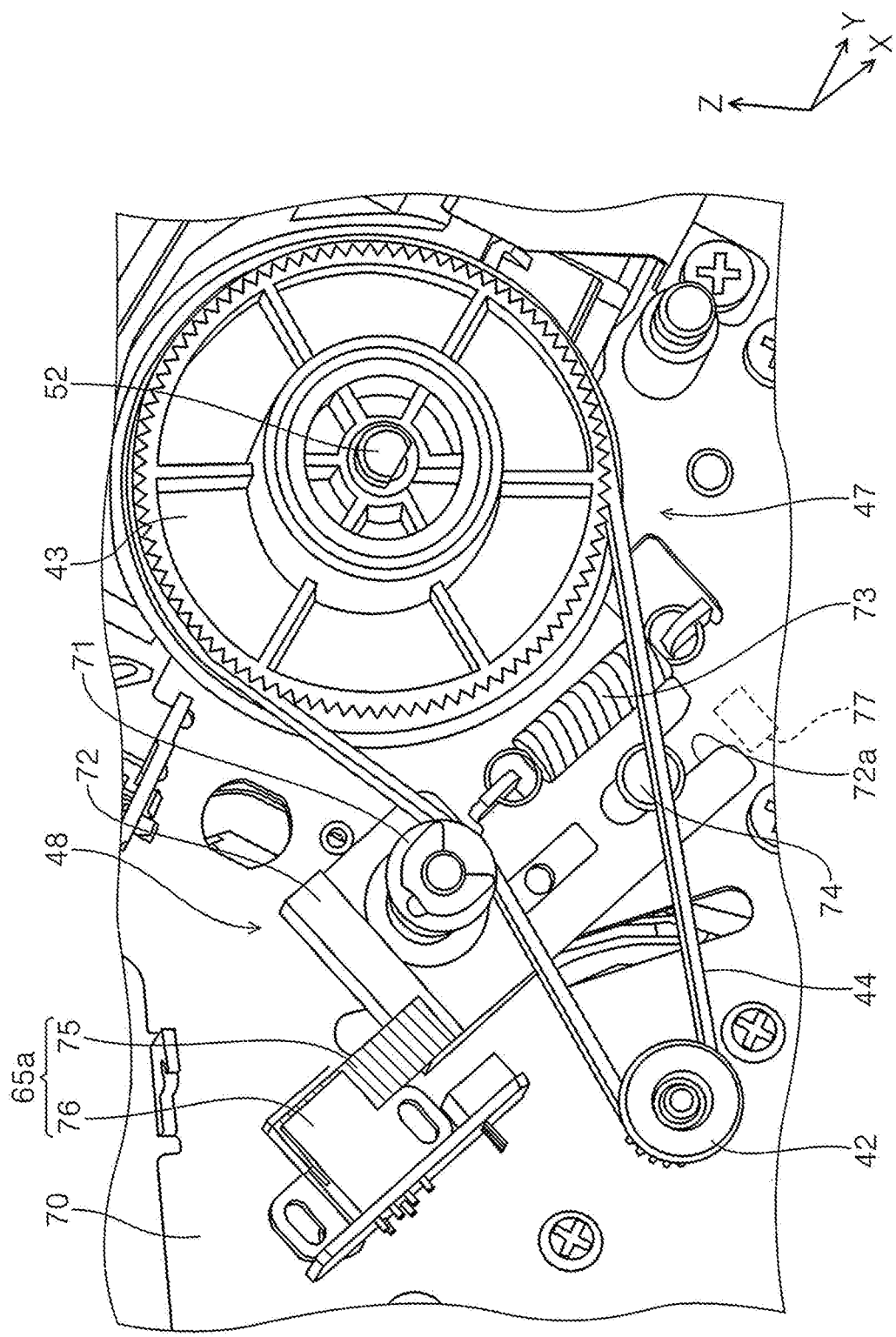
FIG. 8 is a partially enlarged view of FIG. 7.

The second tension imparting portion 48 illustrated in FIG. 8 includes a pulley 71, a holder 72, and a pulling spring 73. The pulley 71 is in contact with the belt 44, and the holder 72 is displaceable in a direction in which the pulley 71 is fixed and the tension of the belt 44 changes, that is, a direction along an arrow C. One end of the pulling spring 73 is provided on a side frame 70 on which the second belt mechanism 47 is provided, and the other end thereof is provided on the holder 72. As a result of the holder 72 being pulled in the arrow C direction, the pulley 71 presses the belt 44, and thus tension is imparted to the belt 44.

A guide groove 72*a* is provided on the holder 72, and movement of the holder 72 in the direction along the arrow C is guided as a result of a projection portion 74 provided on the side frame 70 engaging with the guide groove 72*a*.

When driving of at least one of the first driving roller 16*a* and the second driving roller 17*a* is suppressed due to occurrence of a jam, the rotation of the eighth gear 43 is suppressed. When the second drive source 27 is continuously driven in this state, the belt 44 slackens, and as a result, the holder 72 is displaced in the arrow C direction. The third auxiliary detection unit 65*a* detects this displacement.

The third auxiliary detection unit 65*a* includes a scale 75 and an encoder 76. The scale 75 is attached to an upper portion of the holder 72, and the encoder 76 reads the position of the holder 72 and transmits a signal of the position to the control unit 19.

To be noted, instead of employing the configuration including the scale 75 and the encoder 76, a switch sensor that is pressed in the case where the holder 72 is displaced in the arrow C direction by a predetermined distance or more can be provided as the third auxiliary detection unit 65*a* in a position 77 illustrated in FIG. 8.

Control by Control Unit

The control unit 19 controls the transport unit 9 on the basis of the detection result of the detection section 60.

More specifically, the control unit 19 determines whether or not a jam of the paper sheet P has occurred with reference to a detection result of the auxiliary detection section 62 in the case where the sound detection unit 61 has detected a sound of a magnitude equal to or greater than a first threshold value T, and controls the transport unit 9 on the basis of a result of the determination.

In the case of detecting a jam of the paper sheet P, the jam can be detected also by using only one of the sound detection unit 61, the first auxiliary detection unit 63, the second auxiliary detection unit 64, and the third auxiliary detection unit 65. However, among these, when the sound detection unit 61 is used, earlier jam detection can be expected than when the first auxiliary detection unit 63, the second auxiliary detection unit 64, and the third auxiliary detection unit 65 that detect amounts of change in values different from the magnitude of the sound are used. However, there is a risk of erroneous detection occurring as a result of picking up a sound that is not the sound generated by occurrence of a jam (for example, a sound from the outside of the apparatus or a sound from a driving system inside the apparatus).

The control unit 19 determines whether or not a jam of the paper sheet P has occurred with reference to a detection result of the auxiliary detection section 62 in the case where the sound detection unit 61 has detected a sound of a magnitude equal to or greater than a first threshold value T, and, as a result of this, the reliability of jam detection by the detection section 60 can be enhanced, and the paper sheet P can be transported more appropriately.

Control performed by the control unit 19 will be described in further detail with reference to FIGS. 9 and 10.

In the case where the sound detection unit 61 has detected a sound of a magnitude equal to or greater than the first threshold value T, the control unit 19 stops driving of the transport unit 9 when any one of the first auxiliary detection unit 63, the second auxiliary detection unit 64, and the third auxiliary detection unit 65 detects a change equal to or greater than a predetermined value in a value detected thereby, and continues driving of the transport unit 9 when none of the first auxiliary detection unit 63, the second auxiliary detection unit 64, and the third auxiliary detection unit 65 detects a change equal to or greater than the predetermined value in the value detected thereby.

In the present embodiment, the driving of the transport unit 9 is stopped when at least one of the first auxiliary detection units 63*a* and 63*b* serving as the first auxiliary detection unit 63, the second auxiliary detection units 64*a* to 64*c* serving as the second auxiliary detection unit 64, and the third auxiliary detection units 65*a* and 65*b* serving as the third auxiliary detection unit 65 detect a change equal to or greater than the predetermined value in the value detected thereby.

FIG. 10 illustrates change in values detected by the sound detection unit 61 and the auxiliary detection section 62 (the first auxiliary detection unit 63, the second auxiliary detection unit 64, and the third auxiliary detection unit 65) according to transport of the paper sheet P. The vertical axes of the graphs indicate magnitude of values of the respective detection units, and the horizontal axes indicate the transport position of the paper sheet P.

As has been described above, the sound detection unit 61 is likely to respond first when a jam occurs. In the case where it is assumed that the value of the sound detection unit 61 exceeds a first threshold value T1 when the paper sheet P is transported to a position y1, amounts of change in the values of the first auxiliary detection unit 63, the second auxiliary detection unit 64, and the third auxiliary detection unit 65 are monitored after this. When the amount of change in any one of the values of the first auxiliary detection unit 63, the second auxiliary detection unit 64, and the third auxiliary detection unit 65 exceeds a second threshold value (second threshold value $L_D$ for the first auxiliary detection unit 63, second threshold value $L_E$ for the second auxiliary detection unit 64, and second threshold value $L_F$ for the third auxiliary detection unit 65) set for each of the first auxiliary detection unit 63, the second auxiliary detection unit 64, and the third auxiliary detection unit 65, the control unit 19 determines that a jam has occurred. Then, driving of the transport unit 9 is stopped.

Description will be given again with reference to a flowchart of FIG. 9. When transport of the paper sheet P is started, the control unit 19 determines whether or not the value of the sound detection unit has exceeded the first threshold value T in step S1. In the case where the result of step S1 is NO, the process proceeds to step S2, and the driving of the transport unit 9 is continued. Further, the process proceeds to step S3, and whether or not reading of an image has been completed is determined. In the case where the result of step S3 is YES, reading of the paper sheet P is finished. In the case where the result of step S3 is NO, the process returns to step S1.

In contrast, in the case where the result of step S1 is YES, the process proceeds to step S4, and it is determined whether or not the amount of change in a value detected by at least one of the first auxiliary detection unit 63, the second auxiliary detection unit 64, and the third auxiliary detection unit 65 has exceeded the second threshold value (second threshold value $L_D$ for the first auxiliary detection unit 63, second threshold value $L_E$ for the second auxiliary detection unit 64, or second threshold value $L_F$ for the third auxiliary detection unit 65) after the value of the sound detection unit 61 has exceeded the first threshold value T is determined.

For example, as illustrated in FIG. 10, in the case where a value D detected by the first auxiliary detection unit 63 is equal to or larger than the second threshold value $L_D$ ($D \geq L_D$) and a value E detected by the second auxiliary detection unit 64 and a value F detected by the third auxiliary detection unit 65 are respectively still smaller than the corresponding second threshold values $L_E$ and $L_F$ ($E<L_E$ and $F<L_F$), that is, in the case where the result of step S4 is YES, the control unit 19 determines that a jam has occurred and stops the driving of the transport unit 9, and the process is finished.

In the case where the result of step S4 is NO, that is, in the case where all values of the first auxiliary detection unit 63, the second auxiliary detection unit 64, and the third auxiliary detection unit 65 are smaller than the corresponding second threshold values $L_D$, $L_E$, and $L_F$ ($D<L_D$, $E<L_E$, and $F<L_F$), it is not determined that a jam has occurred and the driving of the transport unit 9 is continued because the sound detected by the sound detection unit 61 is considered to be a sound different from a sound caused by occurrence of a jam (step S2). Since step S3 and subsequent steps following step S2 have been already described, the description thereof will be omitted.

To be noted, in the case where the result of step S4 is NO, there is a sound exceeding the first threshold value T even though a jam has not occurred. In this case, for example, there is a possibility that there is an abnormal sound because a foreign matter is in the apparatus, or a possibility that the driving sound has become louder as a result of wear of expendable parts. In addition, there is also a possibility that, for example, the specification of the paper sheet P does not satisfy a requirement (for example, the thickness thereof exceeds a readable range). An alert for notifying a user of such possibilities may be displayed.

As described above, in the case where the sound detection unit 61 has detected a sound of a magnitude equal to or greater than the first threshold value T, the control unit 19 stops driving of the transport unit 9 when any one of the first auxiliary detection unit 63, the second auxiliary detection unit 64, and the third auxiliary detection unit 65 detects a change equal to or greater than a predetermined value in the value D, E, or F detected thereby, and continues driving of the transport unit 9 when none of the first auxiliary detection unit 63, the second auxiliary detection unit 64, and the third auxiliary detection unit 65 detects a change equal to or greater than the predetermined value in the value D, E, or F detected thereby. Therefore, the reliability of jam detection can be enhanced more.

In addition, in the present embodiment, the second threshold value L for each of the auxiliary detection section 62, that is, the second threshold value $L_D$ for the first auxiliary detection unit 63, the second threshold value $L_E$ for the second auxiliary detection unit 64, and the second threshold value $L_F$ for the third auxiliary detection unit 65 are each set to a value smaller than a threshold value set in the case where each of the first auxiliary detection unit 63, the second auxiliary detection unit 64, and the third auxiliary detection unit 65 detects the occurrence of a jam of the paper sheet P alone instead of in combination with the sound detection unit 61.

In the case where the control unit 19 makes the determination on jam on the basis of a detection value of only one of the first auxiliary detection unit 63, the second auxiliary detection unit 64, and the third auxiliary detection unit 65, erroneous detection occurs frequently when the threshold value serving as the basis of determination is set to a small value, and therefore the threshold value is set to such a value that the determination of jam can be reliably made and erroneous detection does not occur too frequently.

However, in the present embodiment, since it has been already determined that there is a possibility that a jam has occurred on the basis of the detection result of the sound detection unit 61, it is highly possible that a jam has occurred when a detection value of any one of the first auxiliary detection unit 63, the second auxiliary detection unit 64, and the third auxiliary detection unit 65 shows an increasing tendency.

Therefore, the risk of erroneous detection is low even in the case where the second threshold value L (second threshold values $L_D$, $L_E$, and $L_F$) for each of the auxiliary detection section 62 is set to a value smaller than the threshold value set in the case of detecting the occurrence of a jam of the paper sheet P alone instead of in combination with the sound detection unit 61.

As a result of this, the timing of determination of jam by the control unit 19 can be made earlier, and thus jam detection of higher reliability can be performed earlier.

Although the three of the first auxiliary detection unit 63, the second auxiliary detection unit 64, and the third auxiliary detection unit 65 that detect different subjects are provided as the auxiliary detection section 62 in the present embodiment, only one or two of these may be provided as the auxiliary detection section 62.

Other Elements of Control Unit

The control unit 19 can change how the determination of whether or not a jam of the paper sheet P has occurred is made, in accordance with the position of the paper sheet P in the medium transport direction (Y direction).

In the case where the transport position of the leading end of the paper sheet P illustrated in FIG. 2 has reached a nip position N3 of the discharge roller pair 17, the control unit 19 may give higher priority to a detection result of the auxiliary detection section 62, for example, to detection results of the first auxiliary detection unit 63b, the second auxiliary detection unit 64c, and the third auxiliary detection unit 65a than to the detection result of the sound detection unit 61.

In the case where the sound detection unit 61 is provided between the nip position N1 of the feeding roller 14 and the separation roller 15 and the nip position N2 of the transport roller pair 16 in the medium transport direction, when the transport position of the leading end of the paper sheet P reaches the vicinity of the nip position N3 of the discharge roller pair 17, a sound of jam generated when the leading end of the paper sheet P is jammed becomes less likely to be detected by the sound detection unit 61.

Therefore, as a result of the control unit 19 giving higher priority to the detection result of the auxiliary detection section 62 than to the detection result of the sound detection unit 61 in the case where the transport position of the leading end of the paper sheet P has passed the nip position N3 of the discharge roller pair 17, jam detection can be performed with higher reliability.

In addition, as has been described, although jam detection of the paper sheet P can be also performed by using only one of the sound detection unit 61, the first auxiliary detection unit 63, the second auxiliary detection unit 64, and the third auxiliary detection unit 65 that are a plurality of detection units constituting the detection section 60, jam detection based on a detection result of only one detection unit has a risk of erroneous detection to no small extent.

Therefore, the control unit 19 can also perform control such that the driving of the transport unit 9 is stopped when at least two of the four detection units of the sound detection unit 61, the first auxiliary detection unit 63, the second auxiliary detection unit 64, and the third auxiliary detection unit 65 constituting the detection section 60 have detected changes equal to or greater than predetermined values in the values detected thereby and the driving of the transport unit 9 is continued when only one of the plurality of detection units constituting the detection section 60 has detected a change equal to or greater than a predetermined value in the value detected thereby.

Also with this configuration, the reliability of the jam detection by the detection section 60 can be enhanced, and the medium can be transported more appropriately.

In addition, it goes without saying that the invention is not limited to the embodiment described above and can be modified in various ways within the scope of the invention described in the claims, and these modifications are also included in the scope of the invention.

For example, the medium transport apparatus 10 described above can be incorporated in an apparatus different from an image reading apparatus. For example, the medium transport apparatus 10 can be provided in a recording apparatus that performs recording on a transported paper sheet (medium).

The entire disclosure of Japanese Patent Application No. 2018-025168, filed Feb. 15, 2018 is expressly incorporated by reference herein.

What is claimed is:

1. A medium transport apparatus comprising:
a transport unit that transports a medium toward a processing unit that processes the medium;
a driving unit that drives the transport unit;
a control unit that controls the driving unit;
a sound detection unit that detects a magnitude of a sound; and
an auxiliary detection unit that is separate from the sound detection unit and that detects a value of a physical property that is different from the magnitude of the sound,
wherein, in a case where the sound detection unit has detected a sound having a magnitude equal to or greater than a first threshold value, the control unit stops driving of the transport unit when the value detected by the auxiliary detection unit is equal to or greater than a second threshold value,
wherein the control unit stops the driving of the transport unit when the auxiliary detection unit detects a value equal to or greater than a third threshold value that is set in a case of detecting occurrence of a jam of the medium alone instead of in combination with the sound detection unit, and
wherein the second threshold value is set to be smaller than the third threshold value.

2. The medium transport apparatus according to claim 1, wherein the auxiliary detection unit detects a load on the driving unit.

3. The medium transport apparatus according to claim 1, wherein the auxiliary detection unit detects an amount of vibration of the transport unit.

4. The medium transport apparatus according to claim 1, wherein a driving force transmission unit that transmits a driving force of the driving unit to the transport unit includes a belt mechanism that transmits the driving force of the driving unit to the transport unit via a belt,
wherein the belt mechanism includes a tension imparting portion that is displaceable in a direction in which tension of the belt changes and that imparts tension to the belt, and
wherein the auxiliary detection unit detects an amount of displacement of the tension imparting portion.

5. The medium transport apparatus according to claim 1, wherein a driving force transmission unit that transmits a driving force of the driving unit to the transport unit includes a belt mechanism that transmits the driving force of the driving unit to the transport unit via a belt,
wherein the belt mechanism includes a tension imparting portion that is displaceable in a direction in which tension of the belt changes and that imparts tension to the belt,
wherein the auxiliary detection unit includes a first auxiliary detection unit that detects a load on the driving unit, a second auxiliary detection unit that detects an amount of vibration of the transport unit, and a third auxiliary detection unit that detects an amount of displacement of the tension imparting portion, and
wherein, in a case where the sound detection unit has detected a sound of a magnitude equal to or greater than a first threshold value, the control unit stops driving of the transport unit when any one of the first auxiliary detection unit, the second auxiliary detection unit, and the third auxiliary detection unit has detected a change equal to or greater than a predetermined value in a value detected thereby.

6. The medium transport apparatus according to claim 1, wherein a driving force transmission unit that transmits a driving force of the driving unit to the transport unit includes a belt mechanism that transmits the driving force of the driving unit to the transport unit via a belt,
wherein the transport unit includes a discharge roller pair provided downstream of the processing unit,
wherein the belt mechanism includes a tension imparting portion that is displaceable in a direction in which tension of the belt changes and that imparts tension to the belt,
wherein the auxiliary detection unit includes a first auxiliary detection unit that detects a load on the driving unit, a second auxiliary detection unit that detects an amount of vibration of the transport unit, and a third auxiliary detection unit that detects an amount of displacement of the tension imparting portion, and
wherein the control unit gives higher priority to a detection result of the auxiliary detection unit than to a detection result of the sound detection unit in a case where a transport position of a leading end of the medium has reached a nip position of the discharge roller pair.

7. The medium transport apparatus according to claim 1, wherein the transport unit includes a feeding roller that delivers out the medium from a medium mounting portion on which the medium is mounted to a medium transport path, a separation roller that separates the medium by nipping the medium between the separation roller and the feeding roller, and a transport roller pair that transports the medium delivered from the feeding roller toward the processing unit, and
wherein the sound detection unit is provided between a nip position of the feeding roller and the separation roller and a nip position of the transport roller pair in a medium transport direction.

8. The medium transport apparatus according to claim 7, wherein two transport roller pairs are provided as the transport roller pair with an interval therebetween in a width direction crossing the medium transport direction, and
the sound detection unit is disposed so as to at least partially overlap a region from an outer end portion of one of the two transport roller pairs to an outer end portion of another of the two transport roller pairs in the width direction.

9. A medium transport apparatus comprising:
- a transport unit that transports a medium toward a processing unit that processes the medium;
- a driving unit that drives the transport unit;
- a driving force transmission unit that includes a belt mechanism that transmits a driving force via a belt and transmits the driving force of the driving unit to the transport unit by the belt mechanism;
- a tension imparting portion that is provided in the belt mechanism, is displaceable in a direction in which tension of the belt changes, and imparts tension to the belt;
- a plurality of detection units that detect values; and
- a control unit that controls the driving unit,
- wherein the plurality of detection units include at least a sound detection unit that detects a magnitude of the sound, a first detection unit that detects a load on the driving unit, a second detection unit that detects an amount of vibration of the transport unit, and a third detection unit that detects an amount of displacement of the tension imparting portion, and
- wherein, during transport of the medium, the control unit stops driving of the transport unit when the plurality of detection units have detected changes equal to or greater than predetermined values in values detected thereby.

10. An image reading apparatus comprising:
- a reading unit that reads a medium; and
- the medium transport apparatus according to claim 1 including the reading unit as the processing unit.

* * * * *